(12) United States Patent
Alles et al.

(10) Patent No.: US 9,047,593 B2
(45) Date of Patent: Jun. 2, 2015

(54) NON-DESTRUCTIVE MEDIA PRESENTATION DERIVATIVES

(75) Inventors: David Sebastien Alles, Seattle, WA (US); James E. Allard, Seattle, WA (US); Nicholas Robert Baker, Cupertino, CA (US); Adam Tipton Berns, Bellevue, WA (US); Steven Drucker, Bellevue, WA (US); James C. Finger, Kirkland, WA (US); Todd Eric Holmdahl, Redmond, WA (US); David Hendler Sloo, Menlo Park, WA (US); Curtis G. Wong, Medina, WA (US); Dawson Yee, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 13/480,874

(22) Filed: May 25, 2012

(65) Prior Publication Data
US 2012/0259788 A1    Oct. 11, 2012

Related U.S. Application Data

(62) Division of application No. 12/122,841, filed on May 19, 2008, now Pat. No. 8,190,986.

(51) Int. Cl.
| | |
|---|---|
| *G06F 17/00* | (2006.01) |
| *G06Q 20/12* | (2012.01) |
| *G06Q 20/10* | (2012.01) |
| *G06Q 30/02* | (2012.01) |
| *G06F 17/30* | (2006.01) |

(52) U.S. Cl.
CPC ............. *G06Q 20/123* (2013.01); *G06Q 20/10* (2013.01); *G06Q 30/02* (2013.01); *G06F 17/30017* (2013.01); *G06F 17/30174* (2013.01)

(58) Field of Classification Search
CPC ................... G06F 17/30017; G06F 17/30174; G06F 17/17; G06F 17/30056; G06F 17/3079
USPC .......................................... 715/201, 202, 203
See application file for complete search history.

(56) References Cited

U.S. PATENT DOCUMENTS

| | | | |
|---|---|---|---|
| 5,752,244 A * | 5/1998 | Rose et al. ............................. 1/1 |
| 5,758,257 A | 5/1998 | Herz et al. |
| 5,991,403 A * | 11/1999 | Aucsmith et al. ............. 380/217 |
| 6,018,768 A | 1/2000 | Ullman et al. |

(Continued)

OTHER PUBLICATIONS

Office Action for U.S. Appl. No. 11/950,761, mailed on Aug. 2, 2011, Steven M. Drucker, "Spanning Multiple Mediums," 15 pages.

(Continued)

*Primary Examiner* — Laurie Ries
(74) *Attorney, Agent, or Firm* — Dan Choi; Judy Yee; Micky Minhas

(57) ABSTRACT

The claimed subject matter relates to various architectures that can, inter alia, facilitate creation of a synch file as well as facilitate interpretation of the synch file. Both creation and interpretation can be accomplished in conjunction with an original media asset. The synch file can include transformation commands that can operate on a presentation of the asset rather than upon the asset itself. Accordingly, what is actually perceived by a content consumer during a presentation of the asset need not be exactly what the asset creator fixed in a tangible medium. Rather, the content consumer can observe a derivative media presentation based upon interpretation of the synch file.

20 Claims, 12 Drawing Sheets

(56) References Cited

U.S. PATENT DOCUMENTS

| | | | |
|---|---|---|---|
| 6,226,618 B1* | 5/2001 | Downs et al. | 705/51 |
| 6,760,043 B2 | 7/2004 | Markel | |
| 6,792,575 B1* | 9/2004 | Samaniego et al. | 715/202 |
| 6,798,245 B2* | 9/2004 | Ohmae | 326/82 |
| 6,801,261 B1 | 10/2004 | Haynes | |
| 7,042,583 B1* | 5/2006 | Wilkins et al. | 358/1.15 |
| 7,055,104 B1 | 5/2006 | Billmaier et al. | |
| 7,089,576 B1 | 8/2006 | Lynch | |
| 7,930,624 B2 | 4/2011 | Phillips et al. | |
| 8,181,117 B2* | 5/2012 | Bruce et al. | 715/771 |
| 8,533,296 B2* | 9/2013 | McGowan | 709/219 |
| 8,595,342 B2* | 11/2013 | Igelman et al. | 709/223 |
| 8,775,678 B1* | 7/2014 | Cooley et al. | 709/248 |
| 2001/0047298 A1 | 11/2001 | Moore et al. | |
| 2002/0112239 A1 | 8/2002 | Goldman | |
| 2002/0120925 A1 | 8/2002 | Logan | |
| 2003/0028889 A1 | 2/2003 | McCoskey et al. | |
| 2003/0037068 A1 | 2/2003 | Thomas et al. | |
| 2003/0103076 A1 | 6/2003 | Neuman | |
| 2003/0126600 A1 | 7/2003 | Heuvelman | |
| 2003/0158361 A1* | 8/2003 | Yoneda et al. | 526/317.1 |
| 2003/0158862 A1* | 8/2003 | Eshel et al. | 707/200 |
| 2003/0188308 A1 | 10/2003 | Kizuka | |
| 2004/0025668 A1* | 2/2004 | Jarrett et al. | 84/477 R |
| 2004/0085341 A1 | 5/2004 | Hua et al. | |
| 2004/0117833 A1 | 6/2004 | Karaoguz et al. | |
| 2004/0128680 A1 | 7/2004 | Karaoguz et al. | |
| 2004/0143838 A1 | 7/2004 | Rose | |
| 2004/0268224 A1 | 12/2004 | Balkus et al. | |
| 2005/0086688 A1 | 4/2005 | Omoigui | |
| 2005/0086690 A1 | 4/2005 | Gilfix et al. | |
| 2005/0137958 A1 | 6/2005 | Huber et al. | |
| 2005/0188311 A1 | 8/2005 | Diesel et al. | |
| 2006/0064716 A1 | 3/2006 | Sull et al. | |
| 2006/0156327 A1 | 7/2006 | Dolph | |
| 2006/0224775 A1* | 10/2006 | Lee et al. | 709/248 |
| 2007/0006263 A1 | 1/2007 | Uno | |
| 2007/0038610 A1 | 2/2007 | Omoigui | |
| 2007/0039036 A1 | 2/2007 | Sullivan et al. | |
| 2007/0067794 A1 | 3/2007 | Russell et al. | |
| 2007/0107010 A1 | 5/2007 | Jolna et al. | |
| 2007/0124769 A1 | 5/2007 | Casey et al. | |
| 2007/0140656 A1* | 6/2007 | Ergin | 386/95 |
| 2007/0168051 A1 | 7/2007 | Bronnenberg et al. | |
| 2007/0250901 A1* | 10/2007 | McIntire et al. | 725/146 |
| 2008/0005188 A1* | 1/2008 | Li et al. | 707/201 |
| 2008/0031590 A1* | 2/2008 | Kulas | 386/92 |
| 2008/0143875 A1* | 6/2008 | Scott et al. | 348/512 |
| 2008/0228298 A1 | 9/2008 | Rehkemper et al. | |
| 2008/0276279 A1 | 11/2008 | Gossweiler et al. | |
| 2009/0083338 A1* | 3/2009 | Evans et al. | 707/201 |
| 2009/0083820 A1 | 3/2009 | Harrar et al. | |
| 2009/0119594 A1 | 5/2009 | Hannuksela | |
| 2009/0198719 A1* | 8/2009 | DeWitt | 707/102 |
| 2009/0198744 A1* | 8/2009 | Nakamura | 707/201 |
| 2009/0240736 A1* | 9/2009 | Crist | 707/104.1 |
| 2009/0282060 A1 | 11/2009 | Paulussen et al. | |
| 2009/0287987 A1 | 11/2009 | Alles et al. | |
| 2010/0153495 A1 | 6/2010 | Barger et al. | |
| 2011/0047278 A1* | 2/2011 | Penston et al. | 709/227 |
| 2011/0099462 A1* | 4/2011 | Morgan | 714/807 |
| 2011/0154197 A1* | 6/2011 | Hawthorne et al. | 715/704 |
| 2012/0124111 A1* | 5/2012 | Mast et al. | 707/827 |

OTHER PUBLICATIONS

Office Action for U.S. Appl. No. 11/950,761, mailed on Dec. 22, 2011, Steven M. Drucker, "Spanning Multiple Mediums", 18 pgs.
Final Office Action for U.S. Appl. No. 11/767,724, mailed on Mar. 15, 2011, Dawson Yee et al., "Tailored Channel for Content Consumption", 19 pages.
Office Action for U.S. Appl. No. 11/877,827, mailed on Mar. 21, 2012, James E Allard, "Non-Media-Centric Packaging of Content", 16 pgs.
Final Office Action for U.S. Appl. No. 11/950,761, mailed on Apr. 23, 2012, Steven M. Drucker et al., "Spanning Multiple Mediums", 14 pages.
Final Office Action for U.S. Appl. No. 11/941,305, mailed on Sep. 1, 2011, James M. Alkove, "Integrating Ads with Media", 24 pages.
Non-Final Office Action for U.S. Appl. No. 11/767,724, mailed on Sep. 15, 2011, Dawson Yee, "Tailored Channel for Content Consumption", 21 pages.
Non-Final Office Action for U.S. Appl. No. 11/877,827, mailed on Sep. 29, 2011, James Allard, "Non-Media-Centric Packaging of Content", 11 pages.
Office action for U.S. Appl. No. 11/877,827, mailed on May 5, 2014, Allard et al., "Non-Media-Centric Packaging of Content", 14 pages.
Non-Final Office Action for U.S. Appl. No. 11/941,305, mailed on Jul. 1, 2014, James M. Alkove et al., "Integrating Ads with Media", 25 pages.
Office action for U.S. Appl. No. 11/767,724, mailed on Sep. 12, 2013, Yee, et al., "Tailored Channel for Content Consumption", 21 pages.
Non-Final Office Action for U.S. Appl. No. 12/122,841, mailed on Sep. 2, 2011, "Non-Destructive Media Presentation Derivatives", 17 pages.
Office action for U.S. Appl. No. 11/767,724, mailed on Jan. 30, 2014, Yee, et al., "Tailored Channel for Content Consumption", 24 pages.
Office action for U.S. Appl. No. 11/877,827, mailed on Dec. 17, 2013, Allard, et al., "Non-Media-Centric Packaging of Content", 15 pages.
Final Office Action for U.S. Appl. No. 11/941,305, mailed on Feb. 6, 2015, James M. Alkove, "Integrating Ads with Media", 31 pages.

* cited by examiner

NON-DESTRUCTIVE MEDIA PRESENTATION DERIVATIVES

CROSS-REFERENCE TO RELATED APPLICATIONS

This application is a divisional of U.S. application Ser. No. 12/122,841, filed May 19, 2008, patented as U.S. Pat. No. 8,190,986 with an issue date May 29, 2012. This application is also related to U.S. application Ser. No. 11/941,305, filed Nov. 16, 2007, entitled "INTEGRATING ADS WITH MEDIA." This application is also related to U.S. application Ser. No. 11/877,827, filed Oct. 24, 2007, entitled "NON-MEDIA-CENTRIC PACKAGING OF CONTENT." The entireties of these applications are incorporated herein by reference.

BACKGROUND

In recent times, proliferation of audio-visual media has seen a dramatic increase, especially due to Internet-based services and newer technological broadcast platforms and formats. For example, cable and satellite providers supply content on-demand, while radio programs have gone digital and stream their content via the Internet. The majority of this delivered media is professionally authored, yet even amateurs have recently entered the content creation and dissemination business with the advent of video blogs and services that allow members to broadcast themselves.

With so much media available to a content consumer, it is becoming increasingly popular to leverage existing media for creating compilations or mash-ups, parodies and the like that are derived from existing media. Unfortunately, the majority of the media used for such derivative work is professionally created and employed without permission from the author. Thus, most well-known services that allow members to upload their own work, and who might implicitly or explicitly authorize its reproduction, in fact, are often utilizing original work of others that is not so authorized, giving rise to copyright and other legal issues. Thus far, there is no good way to monetize these services; hence, although rampant with copyright infringement, little has been done to address the copyright issues.

Moreover, conventional media editor tools typically overwrite the original media when changes are made, which is a destructive form of editing, since the original media has often been irrevocably changed due to the "lossy" nature of certain transformations. For example, if some original media is, say, rotated 90 degrees clockwise to produce derivative work A, then a subsequent transformation to derivative work A to rotate 90 degrees counterclockwise will not result in an identical version of the original, as data was lost during the transformations. To avoid this situation, it is possible to maintain the original asset and save various versions of derivative works individually. However, this approach is extremely expensive in terms of storage resources, especially with high-grade media, and further presents copyright or other legal issues when the original media is copied without authorization or when a derivative work is fixed in a tangible medium or otherwise violates copyright regulations.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises various distinct architectures that can facilitate both creation and interpretation of a synch file in conjunction with an original media asset. More particularly, the synch file can exist independently of the original media asset in terms of formatting or encoding, data structures, or legal rights. Thus, the synch file can be employed to provide a derivative media experience without destructive editing or modification of the original media asset.

In an aspect of the claimed subject matter, media creation or content editing tools can be supplied for receiving various inputs. Inputs received can be, e.g., transformation actions that operate on an output of the original media asset rather than on the asset itself (e.g., a copyrighted work). In essence, the transformations can alter what a content consumer perceives rather than what an author of the original media asset fixed in a tangible medium. These transformation actions can be recorded in the synch file as a set of commands and synchronized with respect to timing. Thus, when interpreting the synch file during a media presentation, the transformation actions can be applied in a desired order and at desired points during the presentation. Accordingly, a derivative media presentation can be provided based upon changes to an output, yet the original media asset remains in tact and in its original form.

Appreciably, the transformation action defined by the command can interact with a media player device to, e.g., change a volume or another setting that in some way affects the media presentation and therefore produces a derivative media presentation. Additionally, the command can pause, skip, replay, or otherwise navigate through portions of the media presentation to create a derivative media presentation. Still further, the command can overlay, replace, supplement, or interpolate the media presentation with additional content to provide a derivative media presentation. It should be understood that the command can also provide for or verify access or rights to the original media asset (e.g., digital rights management). Thus, even though a given synch file might be freely distributed; infringement or piracy with respect to the associated original media asset can be mitigated.

In accordance therewith and to other related ends, content authors can provide ready customization to their own content without building each variation independently or from scratch, or in some cases with little or no change to a current business practice or production model. Moreover, virtually any previously existing media or content can be leveraged by later work potentially without entangling the author of a compilation or derivative work product in copyright violations or infringement. Furthermore, the claimed subject matter can provide a substantial incentive to expand the scope and commonality of metadata tagging, media indexing, and media warehousing and access, any or all of which can enrich media consumption markets as well as open up new paths or paradigms for media consumption.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
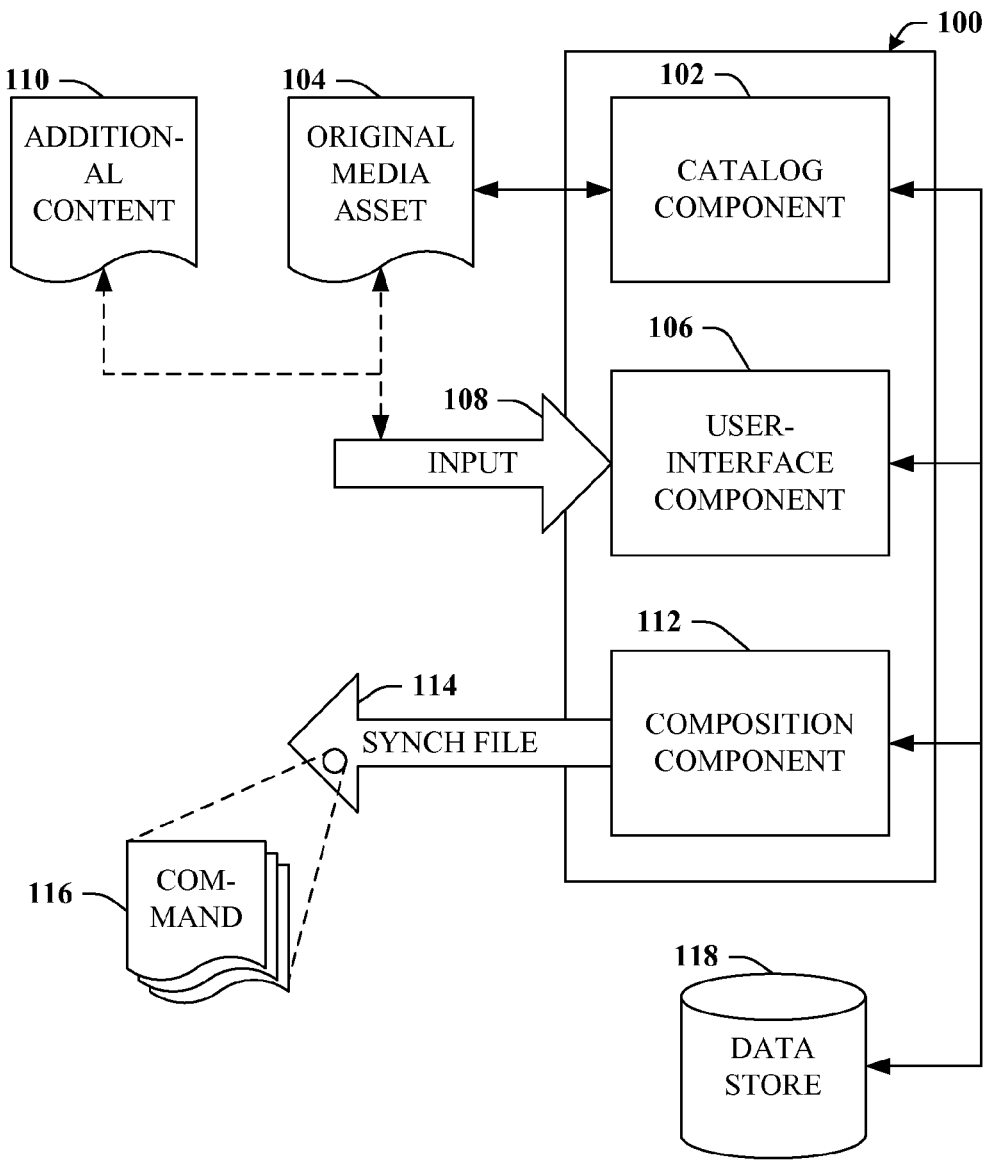
FIG. 1 illustrates a block diagram of a system that can facilitate creation of a synch file employed to provide a derivative media experience without destructive editing or modification of an original media asset.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, system 100 that can facilitate creation of a synch file employed to provide a derivative media experience without destructive editing or modification of an original media asset is depicted. Generally, system 100 can include catalog component 102 that can access one or more original media assets 104. Original media asset 104 can be substantially any type of audio-visual content such as, e.g., music, a film, or a video, and can be stored in any suitable form such as stored in a machine-readable/writable medium, or a data structure or file. Original media asset 104 can include either or both conventional metadata or special metadata, further detailed infra with respect to FIG. 2.

System 100 can also include user-interface component 106 that can receive input 108, wherein input 108 can be associated with a transformation of an output of original media asset 104 and/or associated with additional content 110. In accordance therewith, user-interface component 106 can provide a set of tools designed for content creation and/or modification, including all the media editor tools that are already available or otherwise suitable for use with the claimed subject matter. For example, user-interface component 106 can be employed to record new media, to play existing media, and to perform a variety of transformations that affect the presentation (e.g., the output, whether visually displayed, an audio output, etc.) of media, including original media asset 104. Such transformations can include but are not necessarily limited to pausing or navigating to various portions of original media asset 104, changing the shape, size, color, contrast, orientation, appearance, detail, resolution, quality, volume, tone, pitch, scale, length, duration, order, and so forth of all or a portion of the output of original media asset 104. In addition, the transformations can include replacing, supplementing, overlaying, or interpolating the output of all or a portion of original media asset 104 with new or additional content 110 and/or with a disparate original media asset 104.

Appreciably, user-input component 106 need not modify original media asset 104. Rather, any or all transformations can be performed upon the output/presentation of original media asset 104 (e.g., what is actually perceived by a content consumer) without any modifications to or destructive-type editing of original media asset 104. In previous times, the features described herein were much less relevant if not impossible to achieve given the state-of-the-art with respect to associated hardware devices. Perhaps due to such limitations, today's media distribution essentially is structured to put most of the "work" on the encoding side of media creation in order to make decoding and playback as non-CPU-intensive as possible. With previous hardware devices, this model was the only real viable way to get content distributed in a way that most of the hardware clients could provide reliable playback. Now that hardware devices are advancing to attain sufficient thresholds, the capability of changing that division of labor can be achieved. For example, with more client-based processing available, a scenario in which more "heavy lifting" is on the client side and/or less is on the encoder side can be enabled. One very valuable instantiation of such a scenario can be creating derivative outputs without actually editing an original A/V file (e.g., original media asset 104), but providing a set of transforms (e.g., commands 116 included in synch file 114) for the client to take; thereby preserving the original file but also creating a new experience that can be easy to save, customize, and share.

Accordingly, at least three noteworthy potentially unforeseen benefits can be realized and/or long-felt needs of the marketplace can be satisfied by the claimed subject matter: (1) content authors can provide ready customization without building each variation independently or from scratch, or in some cases with little or no change to a current business practice or production model; (2) virtually any previously existing media or content can be leveraged by later work potentially without entangling the author of a compilation or derivative work product in copyright violations or infringement; and (3) the claimed subject matter can provide a substantial—economic or otherwise—incentive to expand the scope and commonality of metadata tagging, media indexing, and media warehousing and access, any or all of which can enrich media consumption markets as well as open up new paths or paradigms for media consumption.

In addition, system 100 can also include composition component 112 that can create synch file 114 based upon input 108. Synch file 114 can, e.g., supplement original media asset 104 and can include one or more commands 116 as well as timing information, additional content 110, digital rights management (DRM) material or applications and so forth. Typically, command 116 describes a presentation transformation action to be performed upon an audio/visual output of original media asset 104 prior to presentation in order to create a derivative media presentation. Thus, according to an aspect of the claimed subject matter, a desired input 108 is received by user-interface 106 that results in a transformation of the presentation of original media asset 104. In turn, synch file 114 can be populated by composition component 112 with the associated command 116 that produces the transformation.

In more detail, a user, for example, can access original media asset 104, utilize user-interface 106 to decode original media asset 104 from a given storage format to provide perceptible output. The user can zoom to a particular location in the output of the presentation and employ user-interface 106 to make a transformation, say, invert the RGB values of all pixels and then rotate the output 90 degrees clockwise. These two transformations can be saved to synch file 114 as commands 116. Accordingly, original media asset 104 is still in tact and in its original form. Synch file 114 can thus record two commands 116 that will modify the output in the manner desired by the user whenever synch file 114 is interpreted in tandem with original media asset 104. Hence, synch file 114 can in some situations be thought of as a set of instructions that, when executed, modify the output of an associated original media asset 104 to produce a derivative media presentation. Typically, synch file 114 will allow the creator to define constituent elements and can conform to extensible markup language (XML) or some other specification or protocol. It should be understood that presenting original media asset 104, either during creation of synch file 114 or with the derivative media presentation, can be in conformity with certain copyright requirements such as end-user licenses, acquiring synchronization rights, and so forth.

It should be understood that original media asset 104, additional content 110, synch file 114, as well as other data or components described herein or otherwise suitable for use can be saved to data store 118 for later access or recall. Data store 118 is intended to be a repository of all or portions of data, data sets, or information described herein or otherwise suitable for use with the claimed subject matter. Data store 118 can be centralized or distributed, potentially across multiple devices and/or schemas and can be embodied as substantially any type of memory, including but not limited to volatile or non-volatile, sequential access, structured access, or random access and so on. It should be understood that all or portions of data store 118 can be included in system 100, or can reside remotely from system 100.

It should be readily appreciated that a wide array of applications exists for the claimed subject matter. Many such examples of suitable applications for and/or uses of the claim subject matter are described herein. However, before continuing with the description of FIG. 1, additional details relating to original media asset 104 and synch file 114 can now be detailed with reference to FIGS. 2 and 3.

Figure 2:
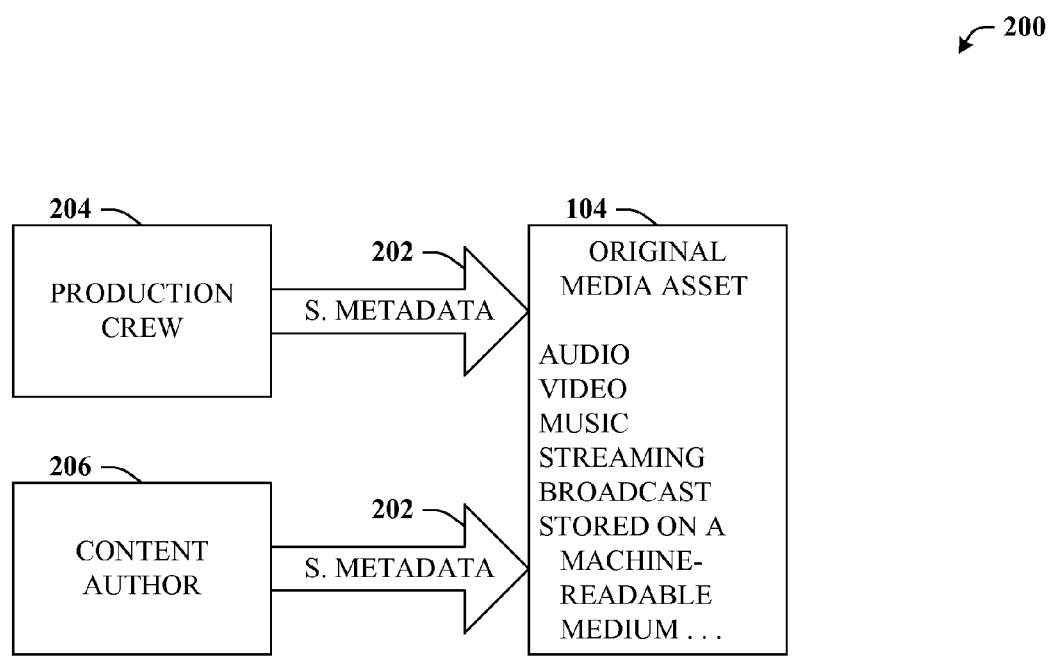
FIG. 2 illustrates various aspects relating to original media asset 104 in further detail.

While still referring to FIG. 1, but turning also to FIG. 2, system 200 illustrates various aspects relating to original media asset 104 in further detail. As introduced supra, original media asset 104 can be substantially any type of audio-visual content including content such as music, news, commercials, feature films, or other audio or video content. In addition, original media asset 104 and can be encoded in any suitable audio (e.g., MP3, M4P, analog signal . . . ) or video (e.g., MPEG-(x), DivX, BluRay . . . ) format. As such, original media asset 104 can exist as a wide variety of mediums such as machine-readable/writable mediums (e.g., magnetic tape, optical discs . . . ), or data structures or files. Accordingly, original media asset 104 can be accessible in a number of ways such as by purchase of media from a retail establishment or by way of a computer network, including local or wide area networks as well as wired or wireless (e.g., cellular, RF spectrum, WiFi, Bluetooth, NFC . . . ) networks, some or all of which can facilitate access by way physical media, streaming, downloading, broadcasting or the like.

Conventional media assets typically include some amount of standard metadata such as name or title, header, author, producer, director, length, performer(s), language, MPAA rating, timing information and so forth. Likewise, original media asset 104 can also include standard metadata. Appreciably, more metadata included in a media asset often facilitates improved features and a richer experience associated with media consumption. Unfortunately, metadata tagging is generally a time-consuming and/or costly endeavor. As a result, most metadata today is quite standard and generally insufficient to maximize the user experience or product features.

Accordingly, original media asset 104 can also include special metadata 202. Special metadata 202 can include information similar to what is found in conventional metadata as well as advertisements or additional information, segment data such as time stamps or indexes, genre, topic, or category, key segments, copyright information or terms of use, protocols, action commands or calls to applications or substantially any suitable data not typically included in conventional metadata. In one aspect, special metadata 202 can be embedded in original media asset 104 by production crew 204 or by content author 206, e.g., during content creation. Additionally or alternatively, special metadata 202 can be produced automatically by, e.g., employing feature recognition techniques or other intelligent examination of the media; or by reference to a production matrix as described herein by reference.

As one example to illustrate both the benefits of employing special metadata 202 as well as the convenience and ease with which such additional information can be developed and utilized, consider a conventional news program (e.g., original media asset 104). In this example, the news program can have one or several authors and/or a production crew to edit and refine the finished product according to their own standard business practices or methods, including the insertion of appropriate metadata. In addition, the production crew or author(s) can also include in the media segment information (e.g., special metadata 202) to describe the various portions of the program.

The segment information can be as general or as detailed as desired, the determination of which can up to the creators, perhaps based upon cost-benefit analyses or marginal utility calculations. However, for this example, it is assumed the segment information is rather general, including only topic-based information to describe each of the segments included in the program, common examples of which can be politics, global news, local news, sports, weather, or financial reports. Appreciably, inclusion of such segment information can be achieved at virtually no additional expense to the news station, yet the benefits can be quite dramatic. For example, synch file 114 can be created based upon personalized data (detailed further with reference to FIG. 4) including commands 116 to skip or access certain segments based upon a particular user's tastes. In accordance therewith, a single news program, created without any substantial change to the news station's production processes, can provide many permutations of derivative works, each based upon original media asset 104 (e.g., the news program) in connection with a particular synch file 114. Hence, a typical news station, which is familiar with producing a daily 60-minute news program, can continue as before, but a consumer of said program might only receive a 25-minute news program, including only the coverage or stories he or she is interested. It can be readily appreciated that such an aspect can facilitate the migration of conventional broadcast media outlets to web-based content delivery with little or no disruption.

Figure 3:
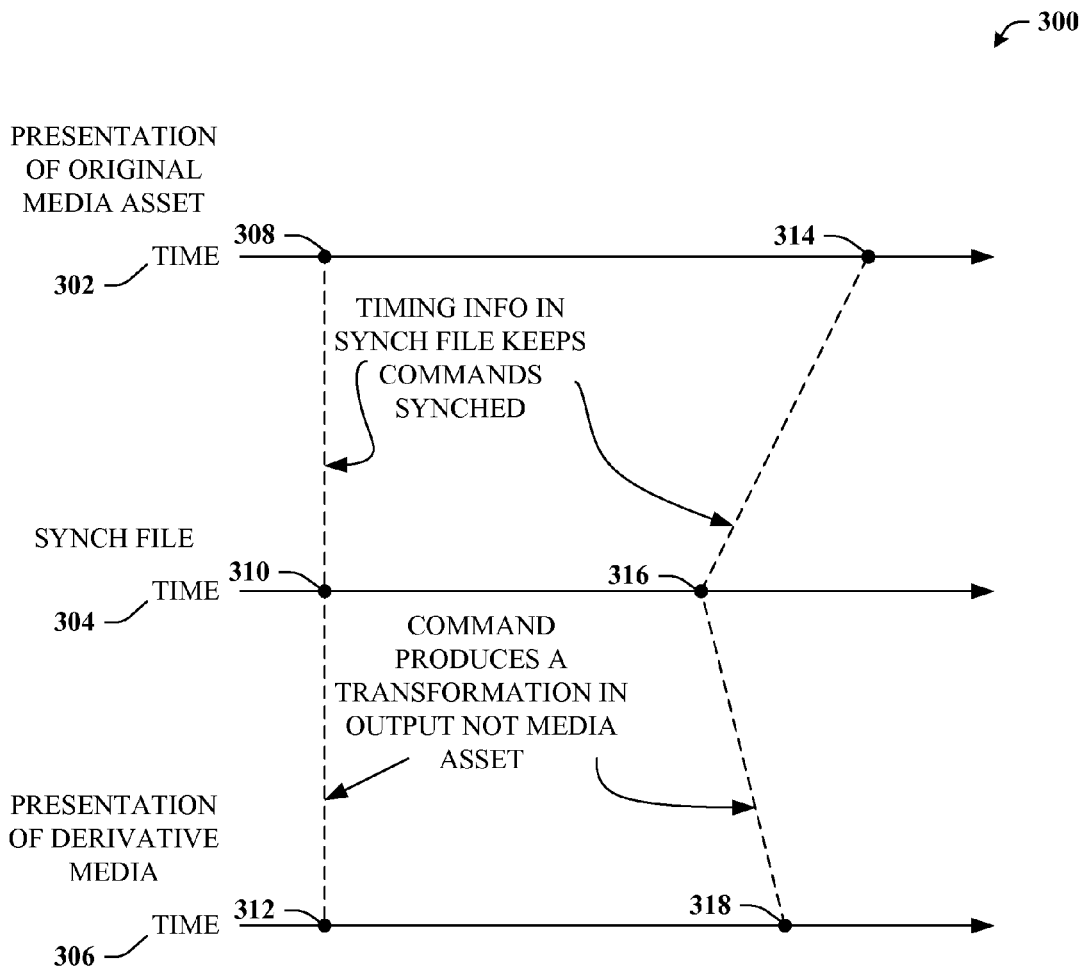
FIG. 3 depicts example timing information associated with the synch file and various media presentations.

Continuing to refer to FIG. 1, but now turning also to FIG. 3, illustration 300 depicts example timing information associated with the synch file and various media presentations. As is presented, illustration 300 depicts three timelines 302-306. Timeline 302 represents a presentation of original media asset 104. Drawing from the example detailed supra, timeline 302 can represent the output of the news program. Timeline 304 corresponds to synch file 114 and typically is the same duration as timeline 302 or timeline 306, the latter of which characterizes the length of a derivative media presentation.

According to an aspect of the claimed subject matter, synch file 114 can be constructed to include timing information associated with original media asset 104 (e.g., metadata or special metadata 202 included in asset 104). As such, synch file 114 can synchronize the presentation transformation action(s) described by command(s) 116 with the output of original media asset 104 to a derivative media output. Hence, as original media asset 104 is presented, commands 116 (which can describe suitable presentation transformation actions) can be executed at specific and/or precise times during the output to produce a derivative media presentation as further detailed with reference to FIGS. 5A, 5B, and 6.

Thus, returning to the news program example, if at time 308 of the program a weather segment is presented, a particular command 116 can be executed at the associated time 310 on timeline 304, which is managed by synch file 114. Accordingly, the transformation affected by command 116 will be apparent in the derivative media presentation at the appropriate time 312. For example, suppose synch file 114 was created for a user who is very interested in local weather. In accordance therewith, command 116 executed at time 310 can be, e.g., a transformation that raises the volume level of the news program, which can be perceived at time 312 of the derivative media presentation.

It should be understood that, although depicted as similar lengths, the presentation of original media asset 104 and the derivative media presentation need not be of equal duration. For example, a particular command 116 can be to skip a segment of the news program and, as such, all else being equal, the derivative media presentation (and potentially synch file 114) would then be shorter than a presentation of original media asset 104. Conversely, another particular command 116 can insert additional content 110, thereby potentially lengthening the derivative media presentation over a presentation of original media asset 104. Such can be readily appreciated based upon times 314-318 depicted in illustration 300.

Figure 4:
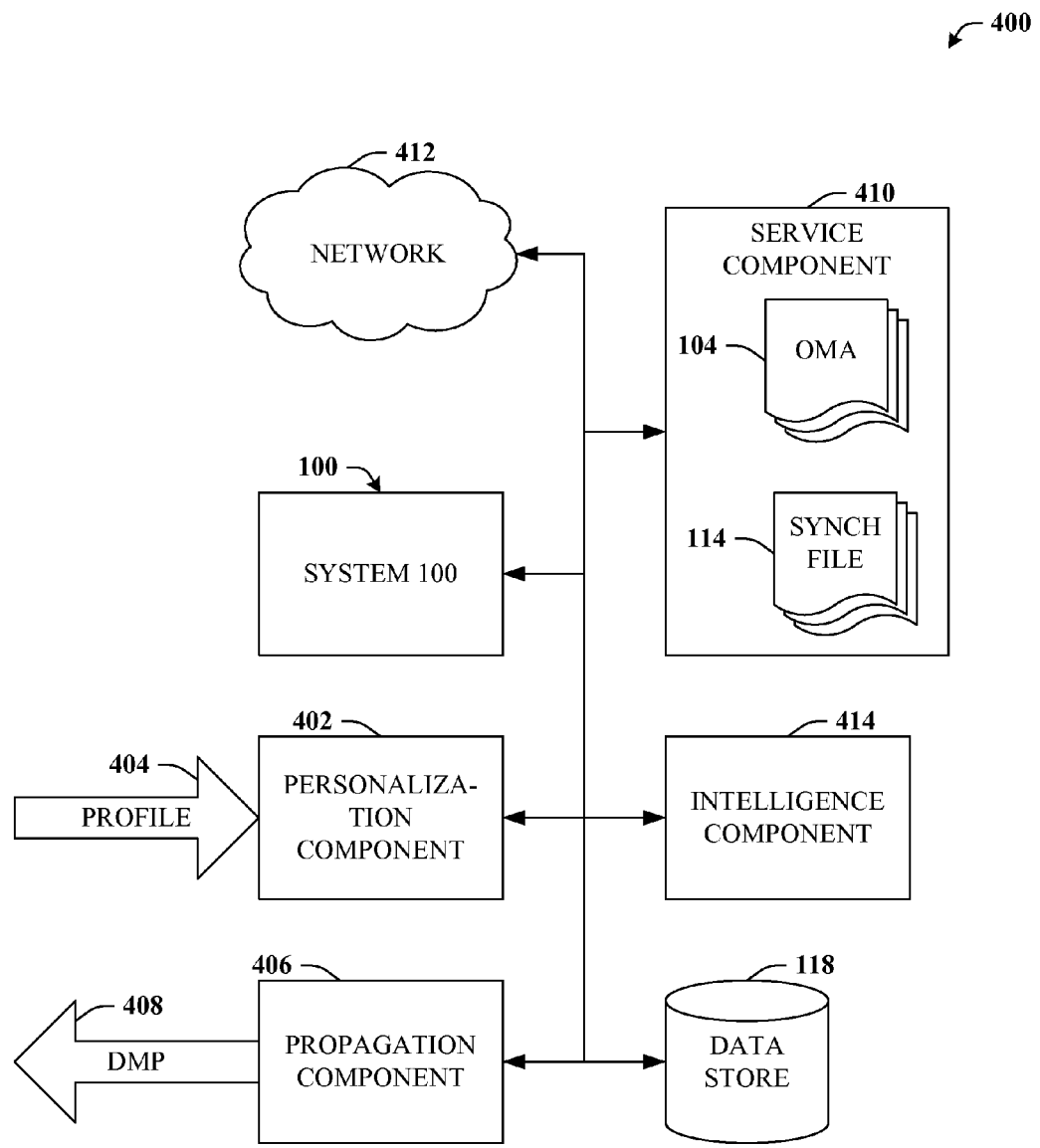
FIG. 4 illustrates a block diagram of a system that can provide various additional features with respect to creation of a synch file for producing a derivative media experience.

Referring now to FIG. 4, system 400 that can provide various additional features with respect to creation of a synch file for producing a derivative media experience is illustrated. In general, system 400 is described as an extensible implementation of system 100. In particular, as provided, system 400 can include catalog component 102, user-interface 106, and composition component 112 detailed in reference to system 100, as well as other features or aspects described supra in connection with FIGS. 1-3. Moreover, while shown for the sake of understanding and ease of description as disparate components, the components presently introduced (e.g., components 402, 406, 410, and 414) can be included in system 100 in various aspects or embodiments.

More specifically, system 400 can include personalization component 402 that can receive user profile 404. Based upon user profile 404, personalization component 402 can dynamically and/or automatically tailor synch file 114. For instance, returning again to the news program example introduced supra, wherein the segment information is embedded in the news program to distinguish different news pieces by category. Suppose further that user profile 404 includes information to indicate interest in stories relating to politics and finance but no interest in weather or sports. Accordingly, personalization component 402 can relay such information to composition component 112 and synch file 114 can be constructed with commands 116 that, e.g., skip all or some sports and weather segments included in the news program and/or request some or all segments relating to politics or finance.

This synch file 114 can be associated with a particular user, for example, the user to whom user profile 404 is associated. Appreciably, when said user subscribes to or otherwise accesses the news program, synch file 114 can ensure that only the segments of interest to the user need be presented. Thus, given a scenario in which original media asset 104 is accessed according to a subscription model, both the content provider and the content consumer can be efficiently satisfied.

Additionally, system 400 can include propagation component 406 that can transmit derivative media presentation 408 in a machine-readable format. Continuing the above illustration, the while personalization component 402 can tailor (e.g., based upon user profile 404) the news program to particular tastes in order to provide derivative media presentation 408, propagation component 406 can be responsible for transmitting the derivative news program, e.g., to the above-mentioned user. It should be understood that because derivative media presentation 408 is derived from original media asset 104 and can now be embodied in a tangible medium (e.g., copied or saved to a file or another medium and stored in a machine-readable format that can be transmitted by propagation component 406) certain copyright issues can arise. However, in certain cases, these issues need not be a major deterrent. In particular, in the present example, the news station is ostensibly the copyright owner of the news program. Thus, the copyright for derivative works constructed with the aid of synch file 114 that are copied to a tangible medium will generally also be owned by the news station. Other cases can exist in which this is not the case, and will be discussed infra.

Further still, system 400 can include service component 410 that can store one or more original media assets 104 as well as one or more synch files 114, wherein each stored synch file 114 can relate to a specific original media asset 104. However, it should be understood that while such can provide additional benefits, it is not necessary for synch file 114 to be associated with an original media asset 104 that is stored by service component 410. Rather, the related original media asset 104 can exist elsewhere. In some situations, service component 410 can utilize data store 118 for data warehousing. It should also be understood that service component 410, as with various other components described herein, can be communicatively or operatively coupled to network 412. Network 412 can be substantially any computer-based network including but not limited to the Internet or other wide area network, an extranet, intranet or local area network and can include substantially any wireless/cellular network.

In an aspect of the claimed subject matter, service component 410 can facilitate access to one or more original media assets 104 and/or to one or more synch files 114, potentially on a subscription basis. For example, consider the following example scenario. It should be appreciated that, as with the news program scenario given above, the present scenario is intended to be demonstrative in nature to provide a concrete illustration of the spirit of the claimed subject matter, but is not necessarily intended to limit the scope of the appended claims.

Suppose original media asset 104 is a popular music composition such as a song performed by a famous artist and produced by a well-known recording label. The song is commonly aired by digital and radio broadcasts and widely available for purchase at retail locations and by network stream or download. Ashley and Ross are avid fans of the song, and both have purchased licensed copies of the song. Ashley's copy is stored on an optical medium such as a compact disc while Ross's copy is in MP3 format, purchased and downloaded from service component 410, and presently stored on his laptop.

Ashley, who is a part-time disc jockey, decides to "re-mix" the song by changing the modulation in a particular range of frequencies, and also by overlaying recordings of her own voice at certain times during the presentation of the song. Ashley therefore makes the appropriate inputs to user-interface 106 and composition component 112 produces the synch file 114 that can include the aforementioned transformations and the voice recordings (e.g., additional content 110), both of which can be indexed to specific times of the presentation of the song. Appreciably, Ashley has not altered her copy of the song in any way, but has instead saved a set of presentation transformation actions to synch file 114 that, when processed, can recreate her "re-mix" with respect to a presentation of the song. Next, Ashley emails her synch file to Ross.

Ross saves the synch file to the hard drive of his laptop and calls his favorite jukebox application by mouse-clicking the synch file (e.g., synch file types can be associated with the media player applications). Since the synch file is associated with the song, the jukebox application can also load the song into memory (potentially checking for appropriate rights based upon DRM or other techniques) that Ross previously purchased. However, rather than simply decoding and outputting the song, the jukebox application can process Ashley's synch file simultaneously and perform any transformations included therein upon the output. Thus, even though the jukebox is decoding the song, the application can also perform the aforementioned transformations at the appropriate times. Hence, Ross can experience the different modulations and Ashley's voice-overs that are included or defined in her synch file, exactly as Ashley intended, yet still avoid certain copyright issues that might arise. In particular, in the scenario above, Ashley did not save or copy original media asset 104 (e.g., the song) or a derivative thereof, but instead only saved her own work product to synch file 114. For Ross's part, he previously owned a licensed copy of the song and was authorized to use Ashley's synch file.

Continuing with the present example, Ross is very impressed with Ashley's "re-mix," and he encourages her to distribute the synch file to others. Ashley agrees and uploads her synch file to service component 410, where service component 410 can associate her synch file with the song and can also include information about the author of synch file 114 (e.g., Ashley) as well as other information or references.

While browsing the content included on service component 410, Debbie notices Ashley's synch file. Debbie is not familiar with the song it references, but was childhood friends with Ashley. Curious to see what her old friend has created, she downloads the synch file. Since, Debbie does not currently have a copy of the song that, too, can be downloaded from service component 410 (potentially incurring an access fee). Like Ross, Debbie is duly impressed and decides to let Ashley know.

It should be appreciated that synch file 114 can include an initial command 116 to verify the existence of a local copy of original media asset 104. If not found, a second command 116 can call an application, say, a browser or another communication tool that references service component 410 for immediate download or the like. It should also be appreciated that in some cases, a particular original media asset 104 may not be available on service component 410, however, it can still be beneficial for the service component 410 to store, maintain, and/or provide access to an associated synch file 114 as the interested party might already own a licensed copy of original media asset 104 before obtaining synch file 114 (as was the case with Ross), or might acquire asset 104 elsewhere, e.g., directly from the artist, recording label, or authorized distributor.

Ashley notes with pride and satisfaction that her synch file has been accessed several thousands of times from service component 410 and is starting to create a buzz on music blogs around the Internet. Thus, although she originally listed her synch file on service component 410 to be freely available, she now feels that she can leverage the popularity of the synch file for some economic gain.

In an aspect of the claimed subject matter, service component 410 can allocate profits from access fees to a copyright owner or to a content author. For example, service component 410 can be subscription based, requiring a membership fee or an access fee for each download of content. Thus, in the present illustration, not only can the artist or recording label receive revenue each time the song is downloaded, but Ashley can receive a payment whenever her synch file is downloaded. It should be underscored that unlike conventional systems or services, where copyright infringement is rampant, copyright owners of original media asset 104 might actually appreciate and encourage the use of synch files 114. Such a situation is readily apparent in the case of Debbie, who purchased the song only because she was interested in the associated synch file created by Ashley.

In an additional or alternative aspect, Ashley need not designate a fee for access to her synch file to generate income. Rather, in addition to the synch file, she can also upload her own content as original media asset 104. Recall, that part of her synch file included recordings of her own voice. While this content was encapsulated in her synch file, such need not be the case. Thus, for example, Ashley can extract that content from the synch file, save the content in a preferred format, and upload the voice-over to service component 410. Appreciably, rather than including her voice-overs, synch file 114 can instead include a reference to her original content, much like synch file 114 references the popular song. Now, Ashley can maintain a policy of free downloads of her synch file, but charge a small fee to access her content necessary to properly process her synch file. For example, in this scenario, Ashley's synch file can reference both her voice-overs and the popular song to provide her derivative experience. It can therefore be appreciated that while many of the examples provided herein illustrate one or many synch files 114 associated with a single original media asset 104, a single synch file 114 can also reference multiple original media assets 104 as well as additional content 110.

In addition to the news program example and Ashley's "re-mix" example, numerous additional applications can exist for the claimed subject matter. For instance, the described features can facilitate countless new varieties of parodies, compilations, or mixed media mash-ups.

In another aspect of the claimed subject matter, system 400 can also include intelligence component 414 that can provide for or aid in various inferences or determinations. It is to be appreciated that intelligence component 414 can be operatively coupled to all or some of the aforementioned components. Additionally or alternatively, all or portions of intelligence component 414 can be included in one or more of the components. Moreover, intelligence component 414 will typically have access to all or portions of data sets described herein, such as data store 118, and can furthermore utilize previously determined or inferred data.

Accordingly, in order to provide for or aid in the numerous inferences described herein, intelligence component 414 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5A:
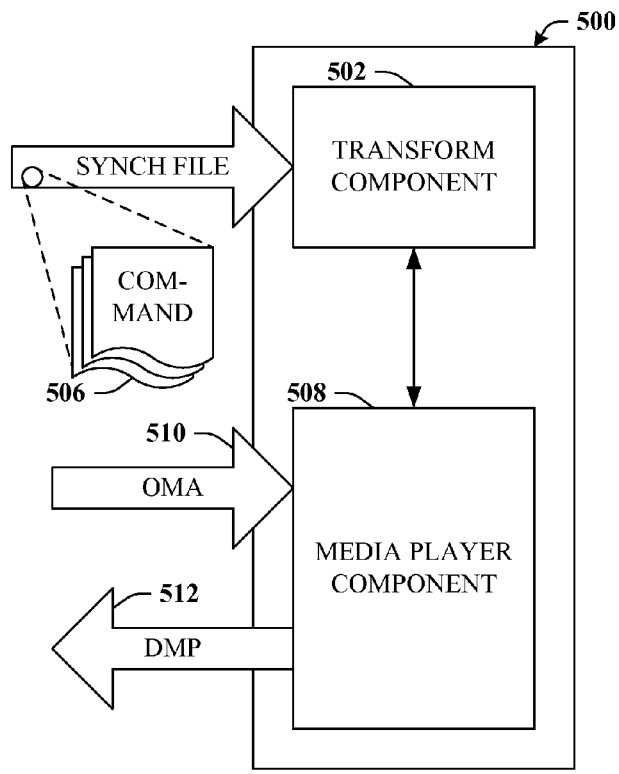
FIG. 5A is a block diagram of a system that can utilize a synch file to facilitate consumption of a derivative media presentation based upon an original media asset.

Turning now to FIG. 5A, system 500 that can utilize a synch file to facilitate consumption of a derivative media presentation based upon an original media asset is provided. Initially, it can be noted that while what has been described above has focused primarily upon the creation of synch file 114, system 500 focuses on interpreting synch file 114 (or synch file 504). In other words, whereas system 100 (or system 400) describes an example system for constructing synch file 114, usually by a content author; system 500 describes a system for reading synch file 114 in conjunction with original media asset 104 in order to provide a derivative media experience, typically for a media consumer and generally by way of a client device media player.

In further detail, system 500 can include transform component 502 that can receive synch file 504. Synch file 504 can be associated with original media asset 510. Transform component 502 can further interpret one or more commands 506 in synch file 504. Both synch file 504 and command 506 can be substantially similar to like components described supra, namely synch file 114 and command 116, respectively. Accordingly, command 506 will typically describe a presentation transformation action to be performed on an audio/visual output of original media asset 510 in order to create derivative media presentation 512. Likewise, elements 510 and 512 can be substantially similar to like elements described above, specifically elements 104 and 408 respectively.

System 500 can also include media player component 508 that can decode and/or read original media asset 510 in order to present an audio/visual output of original media asset 510. Accordingly, media player component 508 can be substantially any media player, either hardware or software, such as a digital video recorder (DVR), a personal video recorder (PVR), a digital versatile disc (DVD) player, a video cassette recorder (VCR), a software media player (e.g., that runs on a personal computer), a gaming console, a cellular phone, a camera, a handheld or wearable device, and so on. It is to be appreciated that media player component 508 can include or be coupled to an associated user interface and other I/O devices such as a display, speakers, keyboard/keypad, navigation keys and so forth.

Media player component 508 can even be a conventional media device, adapted to read original media asset 510. Accordingly, transform component 502 can be operatively coupled to or included in media player component 508 in order to facilitate or aid in interpreting synch file 504 (and/or special metadata 202), which a conventional media player device may not be equipped to translate. Regardless, media player component 508 can output derivative media presentation 512 based upon both original media asset 510 and synch file 504, which is further detailed with reference to FIG. 6 infra.

Figure 5B:
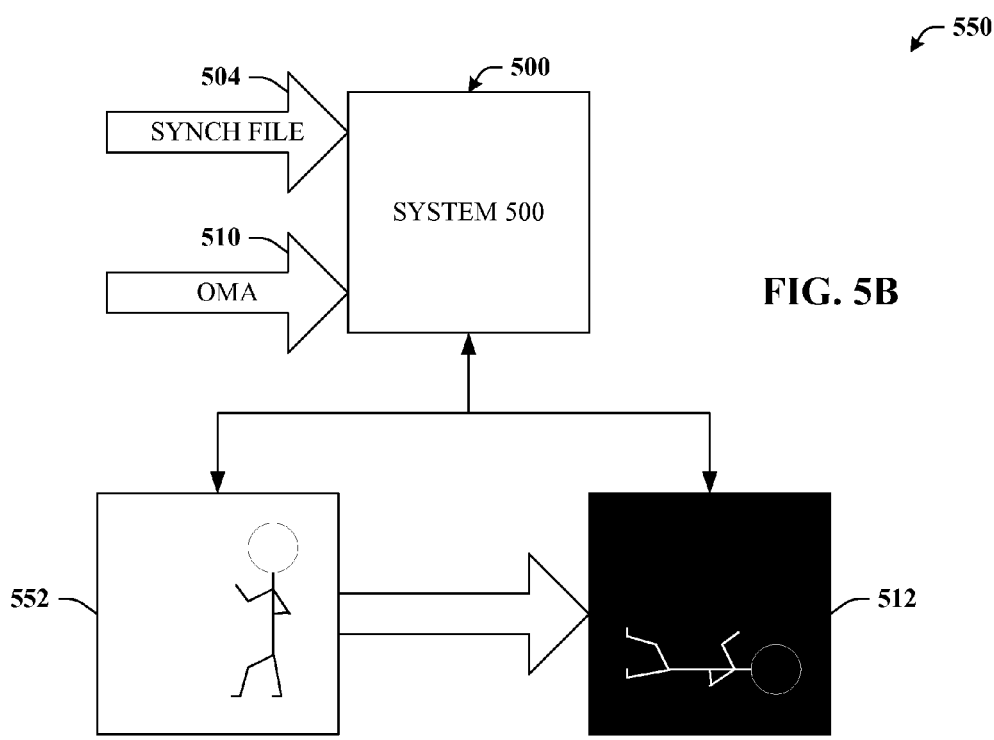
FIG. 5B is graphic illustration of example outputs associated with system 500, including an original media asset output and a derivative media presentation.
Figure 6:
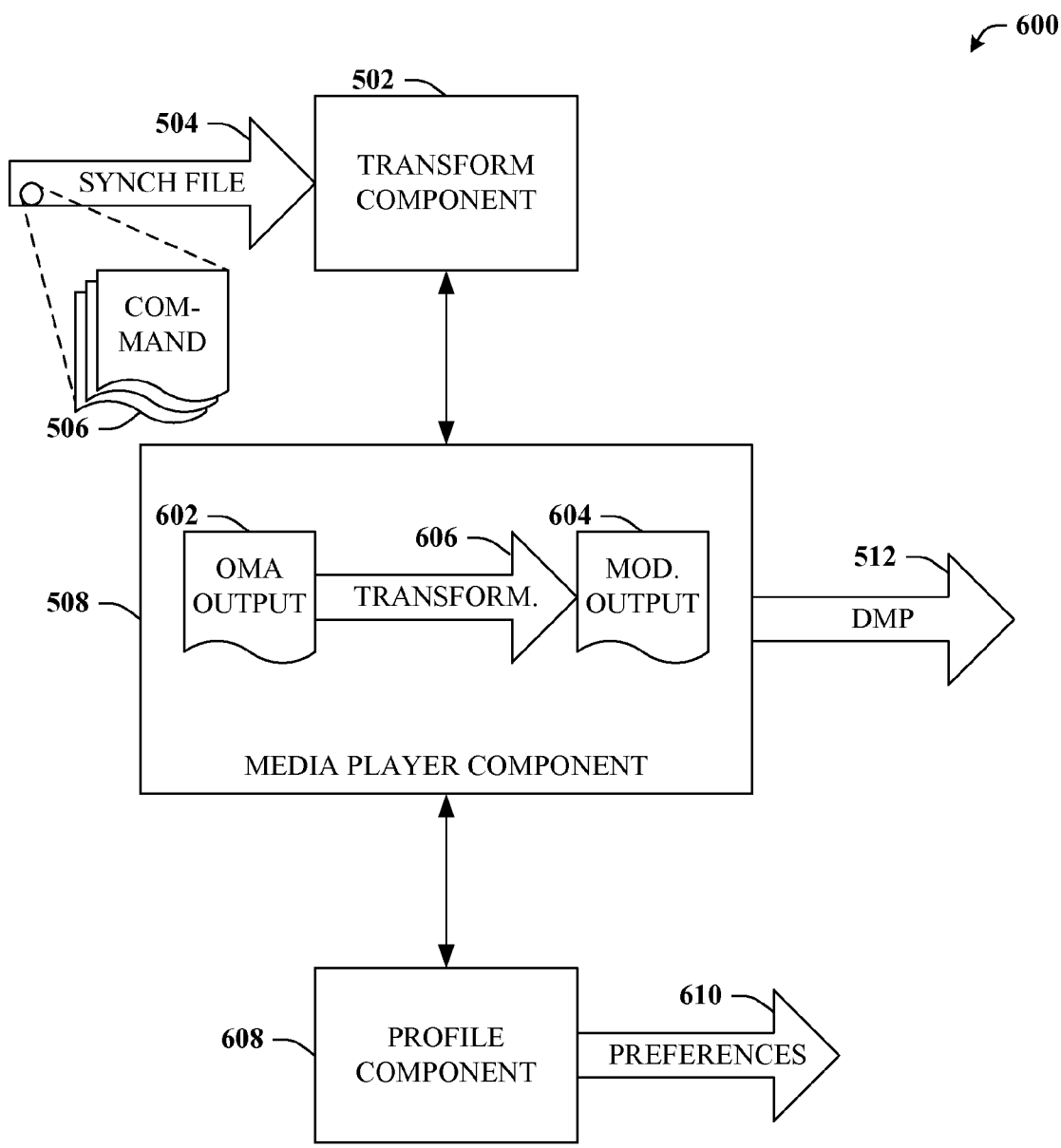
FIG. 6 depicts a block diagram of a system that can facilitate a derivative media experience based upon transformations to an original media asset and can further deploy profile information.

However, before turning to FIG. 6, a holistic graphic illustration 550 of example outputs associated with system 500 is provided with reference to FIG. 5B. As depicted, system 500 can access and/or receive synch file 504 and original media asset 510. As a concrete illustration, but not necessarily intended to limit the scope of the appended claims, original media asset is a video clip of a person walking, while synch file 504 includes two commands that are to be executed simultaneously at a particular time, t, in the video clip. The two commands in this example are (1) to rotate the output 90 degrees clockwise; and (2) to invert the RGB values of all pixels.

As system 500 is adapted to decode and play original media asset 510 (e.g., by media player component 508), illustration 550 depicts snapshot 552 of an output of original media asset 510 if it were presented normally without operation of synch file 504. Specifically, snapshot 552 shows a sample presentation of original media asset 510 at time, t, in the video clip with an individual walking from right to left. However, when interpreting synch file 504, system 500 can display derivative media presentation 512 instead of what would otherwise be output. Namely, beginning at time t, original media asset 510 can be transformed based upon the commands included in synch file 504. Accordingly, what a content consumer will view can be a rotated version of snapshot 552 with all RGB pixels inverted, as depicted by derivative media presentation 512 of illustration 550.

While illustration 550 is intended to be a somewhat simplistic example, it should be understood that numerous addition and much more complex transformations can be described in synch file 504 and therefore interpreted to produce derivative media presentation 512. Moreover, transformation commands included in synch file 510 need not, as here, take place simultaneously, but rather can be executed at various other designated times.

Referring now to FIG. 6, system 600 that can facilitate a derivative media experience based upon transformations to an original media asset and can further deploy profile information is illustrated. Similar to that which is described supra, system 600 can include transform component 502 that receive synch file 504 and that can interpret a set of commands 116 included in synch file 504. In addition, system 600 can further include media player component 508 that can read original media asset 510 in such a manner as would produce original output 602. However, potentially with the aid of transform component 502, command 506 can be interpolated with original output 602 to produce modified output 604. In particular, command 506 can define a presentation transformation action 606 to be performed upon an audio/visual output (e.g., original output 602 as opposed to original media asset 510) prior to presentation of the output in order to create modified output 604, which, once presented, can be derivative media presentation 512. Appreciably, one of transform component 502 or media player component 508 can automatically synchronize content included in original media asset 510 with content or commands included in synch file 504.

Additionally, system 600 can further include profile component 608 that can transmit user preferences 610 to at least one of a personalization component (e.g., personalization component 402) a service component (e.g., service component 410), or a composition component (e.g., composition component 112). Preferences 610 can be substantially similar to profile 404 detailed in connection with to FIG. 4, and can include settings, likes or dislikes, transaction histories, demographic information and so on. One concrete example of preference 610 is a listing of which types of news segments a user does/does not desire to receive, as detailed supra.

Figure 7A:
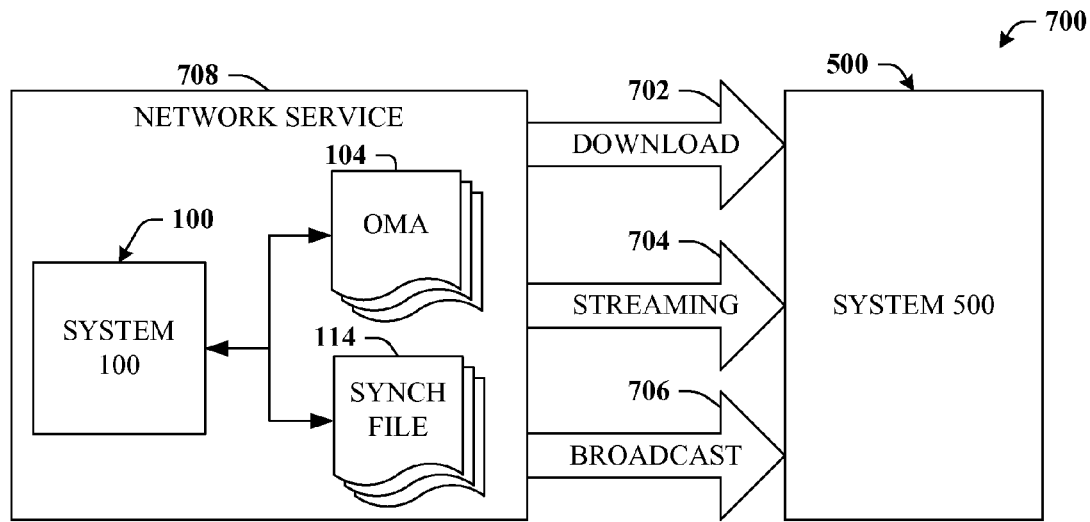
FIGS. 7A and 7B illustrate example operating topologies and/or environments that can be utilized to implement the claimed subject matter.
Figure 7B:
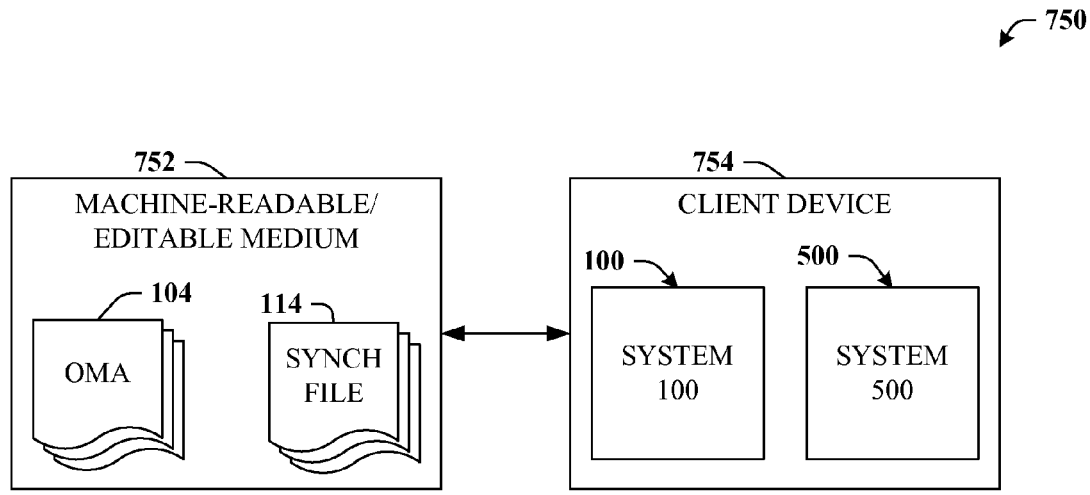

FIGS. 7A and 7B illustrate example operating topologies and/or environments that can be utilized to implement the claimed subject matter. Briefly, FIG. 7A depicts topology 700 in which system 100 (or 400) as well as original media assets 104, 510 and synch files 114, 504 are included in a network cloud or service 708. Appreciably, all or portions of system 100 as well as other components described herein can be components of network service 708. Accordingly, network service 708 can maintain assets and provide access to such assets based upon a client-server model or another model. For example, network service can facilitate downloading 702, streaming 704, or broadcasting 706 of one or both of original media asset 104 or synch file 114 to a client device such as system 500, which can then experience either the original media asset 104 or a derivative media presentation 408.

FIG. 7B illustrates topology 750 in which both original media assets 104 and synch files 114 can be stored upon a machine readable/editable medium 752. It should be appreciated that assets 104 and synch files 114 need not necessarily be included in the same medium 752, but this topology is illustrative of the fact that both can be included in a medium 752, even if on disparate mediums 752. Medium 752 can be read and decoded by client device 754, which can be, e.g., a personal computer or the like. Again, system 100 and system 500 need not both be included in the same client device 754, but it should be appreciated that a client device 754 that includes system 100 can construct synch file 114 (and potentially store it to medium 752), whereas client device 754 that includes system 500 can utilize the synch file to consume the derivative media experience described herein. It should be further appreciated that topologies 700 and 750 are not necessarily mutually exclusive. For example, original media asset 104 can be embedded in medium 752, whereas the associated synch file 114 can reside on network service 708 available for access.

Figure 8:
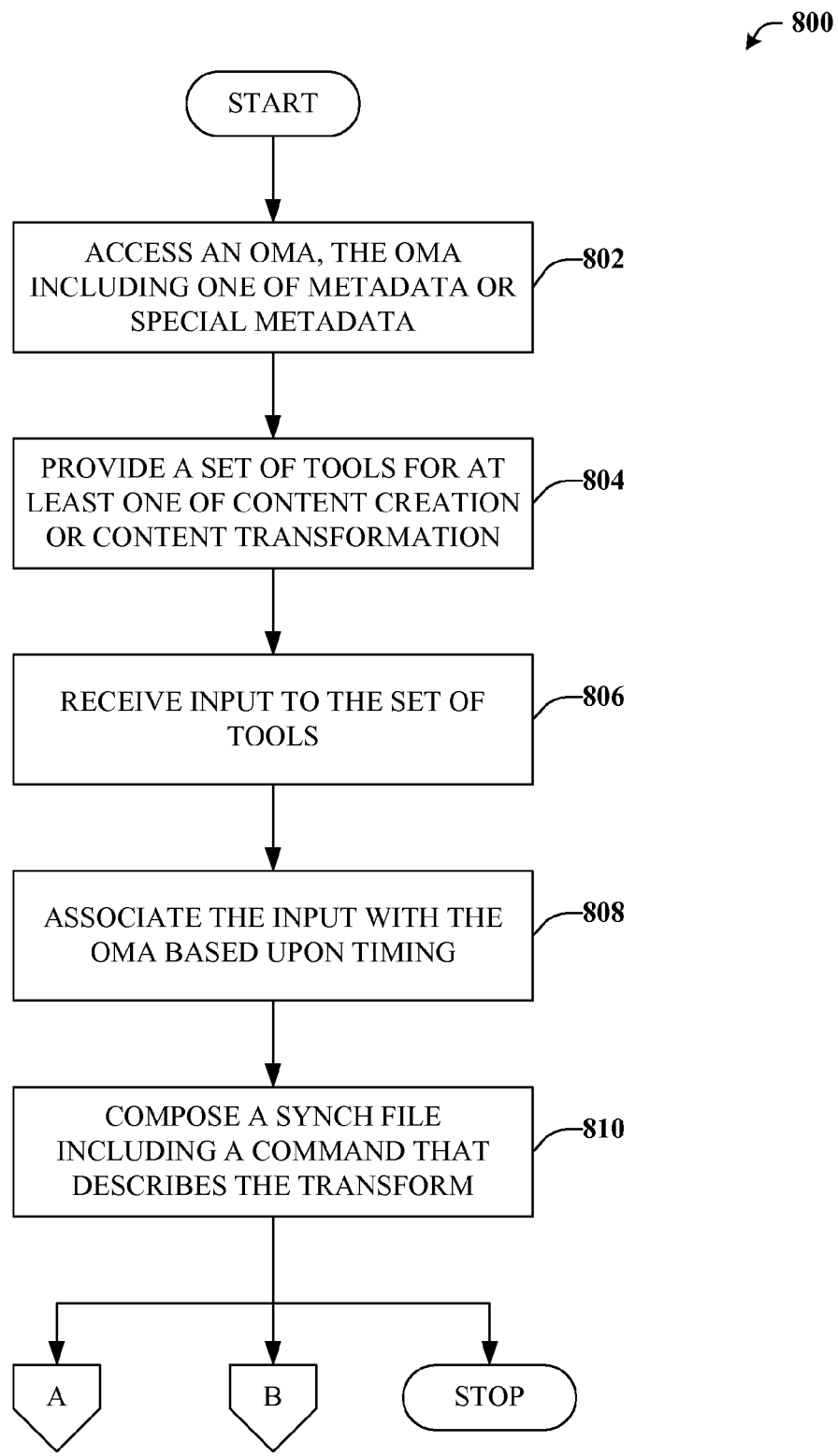
FIG. 8 depicts an exemplary flow chart of procedures that define a method for constructing a derivative media presentation based upon an original media asset without destructive editing or modification of the original media asset.
Figure 9:
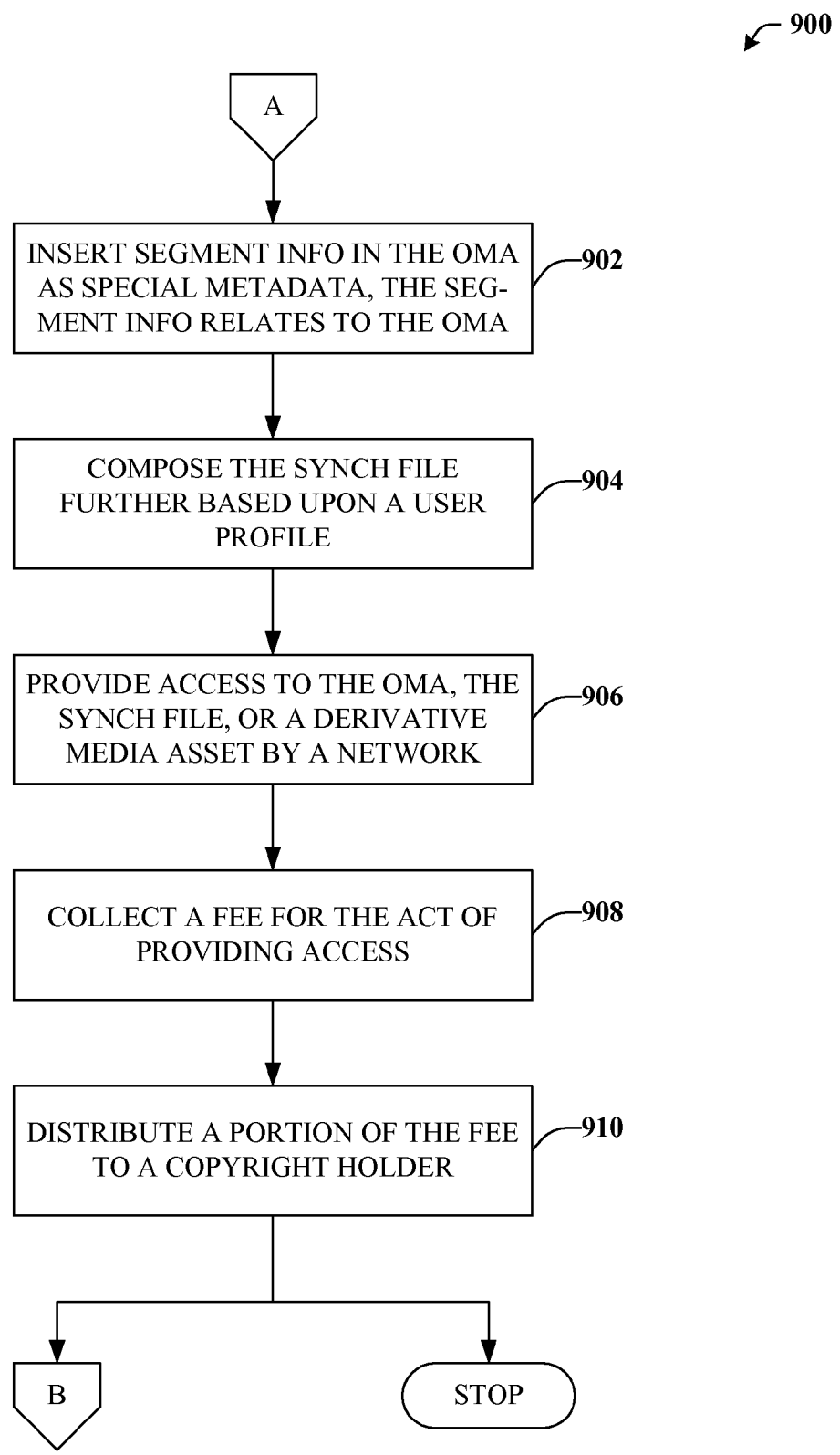
FIG. 9 illustrates an exemplary flow chart of procedures that define a method for constructing components for and providing service associated with derivative media experiences.
Figure 10:
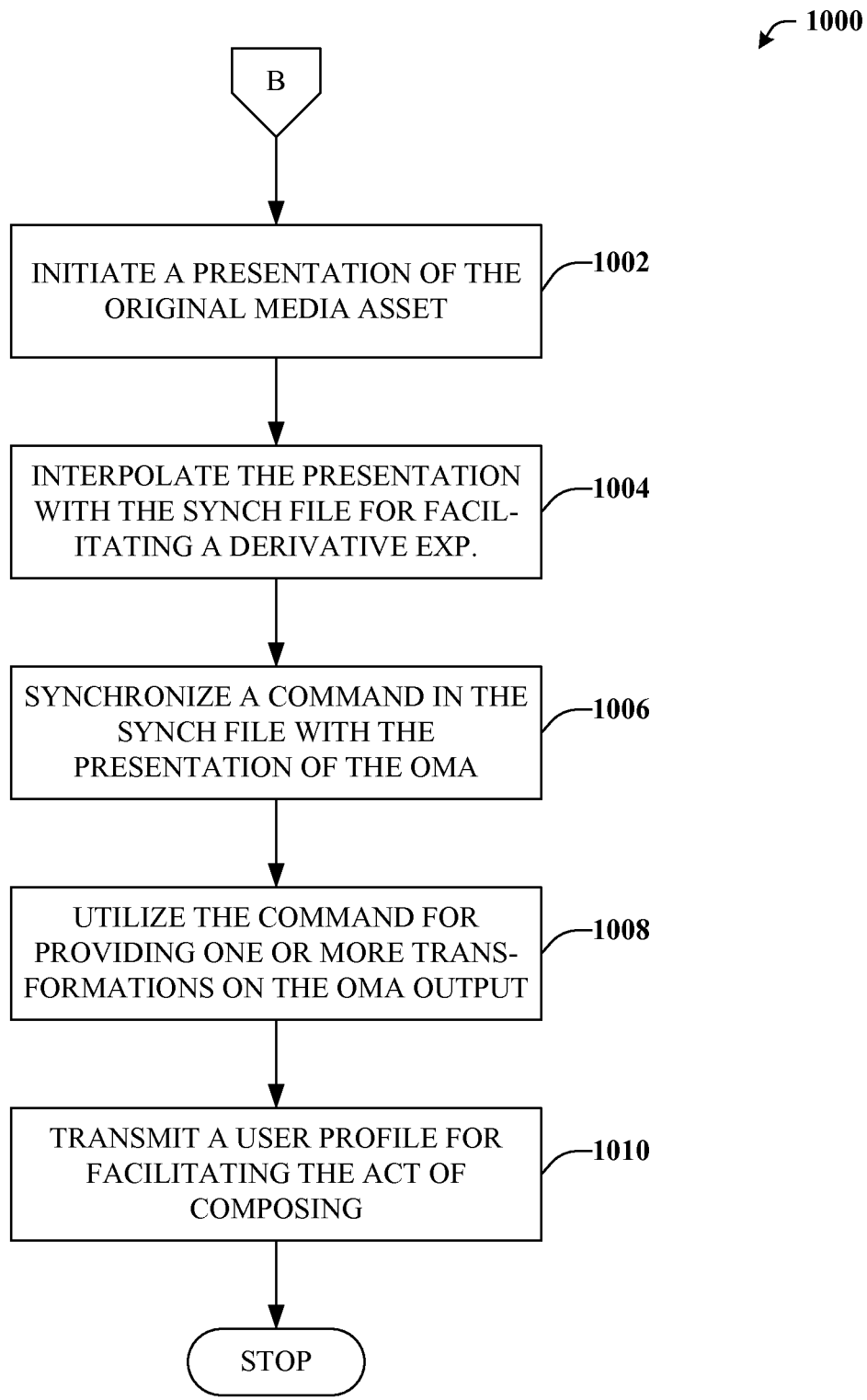
FIG. 10 depicts an exemplary flow chart of procedures defining a method for presenting a derivative media experience based upon an original media asset and an associated synch file.

FIGS. 8, 9, and 10 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 8, exemplary method 800 for constructing a derivative media presentation based upon an original media asset without destructive editing or modification of the original media asset is illustrated. Generally, at reference numeral 802, an original media asset can be accessed, for example, by a media reading device. It should be appreciated that the original media asset can include at least one of metadata or special metadata, the latter of which can include information similar to what is found in conventional metadata as well as advertisements or additional information, segment information, time stamps or indexes, genre, topic, or category, key segments, copyright information or terms of use, protocols, action commands or calls to applications or substantially any suitable data not typically included in conventional metadata.

At reference numeral 804, a set of tools can be provided to facilitate at least one of content creation or content transformation, while at reference numeral 806, input to the set of tools can be received. For example, the tools can provide for recording and storing new content as well as accepting input that can transform an output in any suitable manner. Such can be accomplished by, for example, a user of the claimed subject matter.

At reference numeral 808, the input received at act 806 can be associated with the original media asset based upon timing. For instance, if a transformation of an output of the original media asset is designated to occur at a time, t, in the original presentation, the input that defines the transformation can be associated with time, t. At reference numeral 810, a synch file can be composed based upon the input received at act 806 as well as based upon various other factors. The synch file can include a command that substantially repeats the transformation input. Accordingly, the command can describe content creation, content transformation, or another interaction with an outputting device (e.g., adjusting I/O settings or the like).

Referring to FIG. 9, exemplary method 900 for constructing components for and providing service associated with derivative media experiences is depicted. Initially, at reference numeral 902, segment information can be inserted into the original media asset accessed at act 802. The segment information can be inserted as special metadata, and can relate to at least one of a time stamp, an index number, a genre, a topic, or a category of a portion of the original media asset.

Next, at reference numeral 904, access to at least one of the original media asset, the synch file, or a derivative media asset can be provided. The access can be facilitated by, e.g., a computer network such as the Internet. At reference numeral 904, the synch file composed at act 810 can be further composed based upon a user profile. For example, certain portions of the original media asset can be skipped while additionally or alternatively supplemental content can be overlaid and presented along with a presentation of the original media asset. Moreover, other presentation transformation actions can be taken as well based upon the user profile such as changing a volume, a screen brightness, etc.

Turning to reference numeral 906, access to at least one of the original media asset, the synch file, or a derivative media asset can be provided. Access can be provided by way of a computer network and the access can be subscription based, requiring a membership and/or fee-based access to content. At reference numeral 908, a fee can be collected for the act of providing access described at act 906. Then, at reference numeral 910, a portion of the fee can be distributed to a copyright holder. For example, when the original media asset is accessed, a portion of the associated fee (if any) can be distributed to the copyright holder for that asset. Likewise, when a synch file is accessed, a portion of the associated fee (if any) can be allocated to the author of the synch file.

With reference now to FIG. 10, method 1000 for presenting a derivative media experience based upon an original media asset and an associated synch file is illustrated. Generally, at reference numeral 1002, a presentation of the original media asset can be initiated. Typically, the presentation can be initiated by reading, scanning, and/or decoding the original media asset as is commonly done by any suitable media player device or product in order to output, display or otherwise, the presentation of the original media asset.

Next, at reference numeral 1004, the presentation can be interpolated with the synch file for facilitating a derivative media experience. For example, one or more presentation transformation actions described by the synch file can be applied to the presentation of the original media asset. Thus, the combined interpretation can result in a derivative media experience relative to the output of the original media asset alone. At reference numeral 1006, a command included in the synch file can be synchronized with the presentation of the original media asset. Accordingly, the presentation transformation actions described by the command can be defined to run at a designated time during a presentation.

At reference numeral 1008, the command can be utilized for at least one of skipping or replaying a segment of the original media asset, pausing the original media asset, calling an application on the presenting device or another device, calling a presentation of an advertisement or other information, or for overlaying, replacing, supplementing, or interpolating the output of the original media asset with another original media asset or with content and/or commands included in the synch file or elsewhere and at a designated time. Lastly, at reference numeral 1010, a user profile can be transmitted for facilitating the act of composing at act 904.

Figure 11:
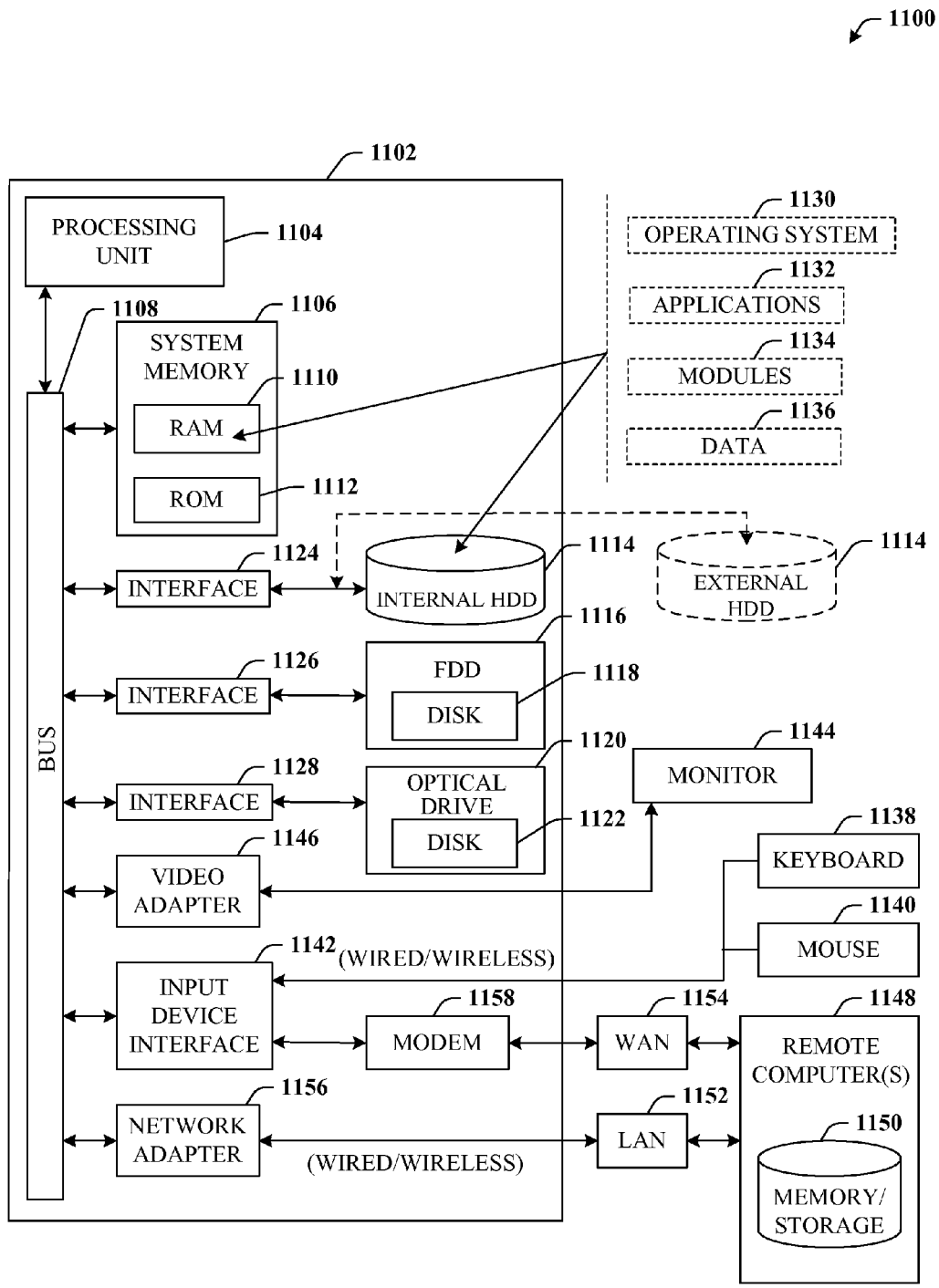
FIG. 11 illustrates a block diagram of a computer operable to execute the disclosed architecture.

Referring now to FIG. 11, there is illustrated a block diagram of an exemplary computer system operable to execute the disclosed architecture. In order to provide additional context for various aspects of the claimed subject matter, FIG. 11 and the following discussion are intended to provide a brief, general description of a suitable computing environment 1100 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the claimed subject matter includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 12:
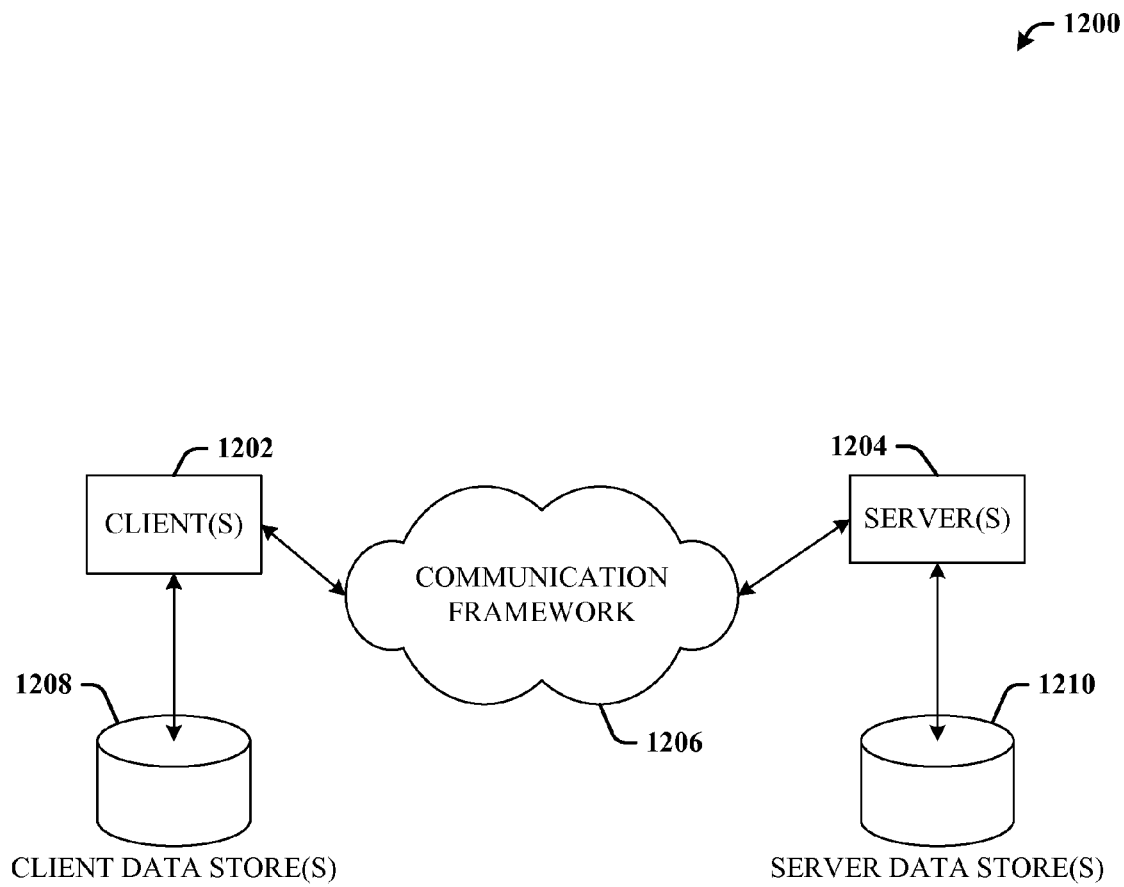
FIG. 12 illustrates a schematic block diagram of an exemplary computing environment.

Referring now to FIG. 12, there is illustrated a schematic block diagram of an exemplary computer compilation system operable to execute the disclosed architecture. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for constructing a derivative media presentation based upon an original media asset, and substantially preserving the original media asset, comprising:
   accessing an original media asset;
   providing a set of tools for at least one of content creation or content transformation;
   receiving input to the set of tools describing the content creation or content transformation;
   associating the input with the original media asset based upon timing; and
   composing a synch file, separate from the original media asset and based upon the timing, the synch file including a command to substantially repeat the received input on the original media asset to repeat the content creation or content transformation of the original media asset.

2. The method of claim 1, further comprising at least one of:
   inserting segment information into the original media asset as special metadata, the segment information relating to at least one of a time stamp, an index number, a genre, a topic, or a category of a portion of the asset;
   composing the synch file further based upon a user profile;
   providing access to at least one of the original media asset, the synch file, or a derivative media asset by way of a computer network;
   collecting a fee for the act of providing access; and
   distributing a portion of the fee to a copyright holder.

3. The method of claim 1, further comprising at least one of:
   initiating a presentation of the original media asset;
   interpolating the presentation with the synch file for facilitating a derivative media experience;
   synchronizing the command in the synch file with the presentation of the original media asset;
   utilizing the command for at least one of skipping or replaying a segment of the original media asset, pausing the original media asset, calling an application, calling a presentation of an advertisement or other information, or for overlaying, replacing, supplementing, or interpolating an output of the original media asset with content included in the synch file at a designated time; or
   transmitting a user profile for facilitating the acts of composing.

4. The method of claim 1, wherein the command describes a content creation or a content transformation action to be performed upon an audio/visual output of the original media asset at a point in a timeline of the audio/visual output specified by the timing.

5. A system, comprising:
   one or more processors;
   a catalog component executable by the one or more processors to access an original media asset;
   a user interface component executable by the one or more processors to receive user input describing content creation or transformation of the original media asset; and
   a composition component executable by the one or more processors to compose a synch file, separate from the original media asset, based upon timing information associated with the user input and to associate the synch file with the original media asset, the synch file including a command to substantially repeat the user input on the original media asset to repeat the content creation or content transformation of the original media asset.

6. The system of claim 5, wherein the original media asset includes at least one of speech, text, video content, or music content.

7. The system of claim 5, further comprising a personalization component executable by the one or more processors to tailor the synch file based on user preferences indicated by a user profile.

8. The system of claim 5, further comprising a propagation component executable by the one or more processors to transmit a derivative media presentation produced from the original media asset based on the synch file.

9. The system of claim 5, wherein the user input component is further executable to provide one or more editing tools, the user input is received via the one or more editing tools, and the user input indicates one or more transformations of the original media asset along a timeline of an output of the original media asset indicated by the timing information.

10. The system of claim 9, wherein the one or more transformations include a change in volume.

11. The system of claim 9, wherein the one or more transformations include one or more of a pause, a skip, or a replay.

12. The system of claim 5, wherein the original media asset includes metadata indicating a segment of the original media asset, and the command includes a command to skip or replay the segment.

13. Computer-readable storage media including a plurality of computer-readable instructions executable to cause one or more processors of a computing device to:
   provide a user interface including one or more editing tools for editing an original media asset;
   receive user input via the one or more editing tools;
   compose a synch file based on user input describing content transformation of the original media asset, the synch file including timing information and a command to substantially repeat the user input on the original media asset to repeat the content transformation of the original media asset at a time indicated by the timing information; and
   associate the synch file with the original media asset.

14. The computer-readable storage media of claim 13, wherein the original media asset includes at least one of speech, text, video content, or music content.

15. The computer-readable storage media of claim 13, wherein the computer-readable instructions are further executable to personalize the synch file based on user preferences indicated by a user profile.

16. The computer-readable storage media of claim 13, wherein the original media asset includes metadata describing one or more aspects of the original media asset, and wherein the computer-readable instructions are further executable to personalize the synch file based on a user profile indicating user interest in one or more of the aspects.

17. The computer-readable storage media of claim 13, wherein the original media asset includes metadata indicating a segment of the original media asset, and the command includes a command to skip or replay the segment.

18. The computer-readable storage media of claim 13, wherein the content transformation includes one or more of a pause, a skip, a change in volume, or a replay.

19. The computer-readable storage media of claim 13, wherein the content transformation includes insertion of additional content into the original media asset.

20. The computer-readable storage media of claim 13, wherein the synch file is usable to generate a non-destructive derivative media presentation based on the original media asset in a way that does not permanently alter the original media asset.

* * * * *